INVENTORS M.R. AARON
J.R. GRAY
F.A. SAAL

BY Jules P. Kirsch
ATTORNEY

TONE SIGNAL SAMPLES V. TIME

COMBINED INPUT & TONE SIGNAL SAMPLES V. TIME

FIG. 5A

TABLE II

DECODED TONE SIGNAL AMPLITUDE FOR THE RECEIVER BOTH INFRAME AND OUT-OF-FRAME

| | DIGIT | WEIGHTING FACTOR | INFRAME | | | ONE BIT OUT-OF-FRAME | | | TWO BITS OUT-OF-FRAME | | | THREE BITS OUT-OF-FRAME | | | FOUR BITS OUT-OF-FRAME | | |
|---|---|---|---|---|---|---|---|---|---|---|---|---|---|---|---|---|---|
| | | | NOTE A | NOTE B | NOTE C | A | B | C | A | B | C | A | B | C | A | B | C |
| FIRST RECEIVED BINARY CODE WORD | 1 | 256 | +0.0497 | +12.72 | | -0.0361 | -9.24 | | -0.0017 | -0.435 | | 0 | 0 | | 0 | 0 | |
| | 2 | 128 | -0.0361 | -4.62 | | -0.0017 | -0.218 | | 0 | 0 | | 0 | 0 | | 0 | 0 | |
| | 3 | 64 | -0.0017 | -0.109 | | 0 | 0 | | 0 | 0 | | 0 | 0 | | 0 | 0 | |
| | 4 | 32 | $-\sim10^{-9}$ | 0 | | 0 | 0 | | 0 | 0 | | 0 | 0 | | 0 | 0 | |
| | 5 | 16 | ~0 | 0 | +7.991 | 0 | 0 | -9.508 | 0 | 0 | -0.4983 | 0 | 0 | -0.1249 | 0 | 0 | -0.2498 |
| | 6 | 8 | ~0 | 0 | | 0 | 0 | | 0 | 0 | | 0 | 0 | | -0.0497 | -0.3976 | |
| | 7 | 4 | ~0 | 0 | | 0 | 0 | | 0 | 0 | | -0.0497 | -0.1988 | | +0.0361 | +0.1444 | |
| | 8 | 2 | ~0 | 0 | | 0 | 0 | | -0.0497 | -0.0994 | | +0.0361 | +0.0722 | | +0.0017 | +0.0034 | |
| | 9 | 1 | ~0 | 0 | | -0.0497 | -0.0497 | | +0.0361 | +0.0361 | | +0.0017 | +0.0017 | | 0 | 0 | |
| SECOND RECEIVED BINARY CODE WORD | 1 | 256 | -0.0497 | -12.72 | | +0.0361 | +9.24 | | +0.0017 | +0.435 | | 0 | 0 | | 0 | 0 | |
| | 2 | 128 | +0.0361 | +4.62 | | +0.0017 | +0.218 | | 0 | 0 | | 0 | 0 | | 0 | 0 | |
| | 3 | 64 | +0.0017 | +0.109 | | 0 | 0 | | 0 | 0 | | 0 | 0 | | 0 | 0 | |
| | 4 | 32 | $+\sim10^{-9}$ | 0 | | 0 | 0 | | 0 | 0 | | 0 | 0 | | 0 | 0 | |
| | 5 | 16 | 0 | 0 | -7.991 | 0 | 0 | +9.508 | 0 | 0 | +0.4983 | 0 | 0 | +0.1249 | 0 | 0 | +0.2498 |
| | 6 | 8 | 0 | 0 | | 0 | 0 | | 0 | 0 | | 0 | 0 | | +0.0497 | +0.3976 | |
| | 7 | 4 | 0 | 0 | | 0 | 0 | | 0 | 0 | | +0.0497 | +0.1988 | | -0.0361 | -0.1444 | |
| | 8 | 2 | 0 | 0 | | 0 | 0 | | +0.0497 | +0.0994 | | -0.0361 | -0.0722 | | -0.0017 | -0.0034 | |
| | 9 | 1 | 0 | 0 | | +0.0497 | +0.0497 | | -0.0361 | -0.0361 | | -0.0017 | -0.0017 | | 0 | 0 | |

NOTE A ... MAGNITUDE OF TONE SIGNAL COMPONENT ON EACH DIGIT.
NOTE B ... MAGNITUDE OF WEIGHTED TONE SIGNAL COMPONENT ON EACH DIGIT.
NOTE C ... MAGNITUDE OF RECOVERED TONE SIGNAL = ALGEBRAIC SUM OF MAGNITUDES IN "NOTE B" COLUMN.

FIG. 5B

TABLE II (CONTINUED)

| FIVE BITS OUT-OF-FRAME | | | SIX BITS OUT-OF-FRAME | | | SEVEN BITS OUT-OF-FRAME | | | EIGHT BITS OUT-OF-FRAME | | |
|---|---|---|---|---|---|---|---|---|---|---|---|
| A | B | C | A | B | C | A | B | C | A | B | C |
| 0 | 0 | | 0 | 0 | | 0 | 0 | | 0 | 0 | |
| 0 | 0 | | 0 | 0 | | 0 | 0 | | -0.0497 | -6.3616 | |
| 0 | 0 | | 0 | 0 | | -0.0497 | -3.1808 | | +0.0361 | +2.3104 | |
| 0 | 0 | | -0.0497 | -1.5904 | | +0.0361 | +1.1552 | | +0.0017 | +0.0544 | |
| -0.0497 | -0.7952 | -0.4996 | +0.0361 | +0.5776 | -0.9992 | +0.0017 | +0.0272 | -1.9984 | 0 | 0 | -3.9968 |
| +0.0361 | +0.2888 | | +0.0017 | +0.0136 | | 0 | 0 | | 0 | 0 | |
| +0.0017 | +0.0068 | | 0 | 0 | | 0 | 0 | | 0 | 0 | |
| 0 | 0 | | 0 | 0 | | 0 | 0 | | 0 | 0 | |
| 0 | 0 | | 0 | 0 | | 0 | 0 | | 0 | 0 | |
| 0 | 0 | | 0 | 0 | | 0 | 0 | | 0 | 0 | |
| 0 | 0 | | 0 | 0 | | 0 | 0 | | +0.0497 | +6.3616 | |
| 0 | 0 | | 0 | 0 | | +0.0497 | +3.1808 | | -0.0361 | -2.3104 | |
| 0 | 0 | | +0.0497 | +1.5904 | | -0.0361 | -1.1552 | | -0.0017 | -0.0544 | |
| +0.0497 | +0.7952 | +0.4996 | -0.0361 | -0.5776 | +0.9992 | -0.0017 | -0.0272 | +1.9984 | 0 | 0 | +3.9968 |
| -0.0361 | -0.2888 | | -0.0017 | -0.0136 | | 0 | 0 | | 0 | 0 | |
| -0.0017 | -0.0068 | | 0 | 0 | | 0 | 0 | | 0 | 0 | |
| 0 | 0 | | 0 | 0 | | 0 | 0 | | 0 | 0 | |
| 0 | 0 | | 0 | 0 | | 0 | 0 | | 0 | 0 | |

FIG. 6

TABLE I

TONE SIGNAL SAMPLE COMPONENTS CARRIED BY EACH DIGIT OF A NINE DIGIT BINARY CODE WORD

| $E/\delta$ \ $\Delta_i$ | $\Delta_1$ | $\Delta_2$ | $\Delta_3$ | $\Delta_4$ | $\Delta_5$ | $\Delta_6$ | $\Delta_7$ | $\Delta_8$ | $\Delta_9$ |
|---|---|---|---|---|---|---|---|---|---|
| 1/8 | 0.04974 | -0.03614 | -0.00171 | $-1.2\times10^{-9}$ | $\backsim 0$ | $\backsim 0$ | $\backsim 0$ | $\backsim 0$ | $\backsim 0$ |

United States Patent Office 3,404,231

Patented Oct. 1, 1968

3,404,231

FRAMING OF PULSE CODE TRANSMISSION SYSTEMS BY USE OF AN ADDED TONE SIGNAL

Marvin R. Aaron, Whippany, James R. Gray, Martinsville, and Frederick A. Saal, Plainfield, N.J., assignors to Bell Telephone Laboratories, Incorporated, New York, N.Y., a corporation of New York Filed Jan. 5, 1965, Ser. No. 423,558
8 Claims. (Cl. 178—69.5)

This invention relates to the framing of pulse code transmission systems and in particular to the use of the phase reversal of a tone signal transmitted together with the information bearing signal, in the framing of such systems.

A pulse code transmission system consists of a transmitter, at which an analog input signal is converted into digital code words, a receiver at which the digital code words are converted into an analog output signal, and a transmission medium over which the code words are transmitted from transmitter to receiver. In a typical transmitter, the amplitude of a time varying analog input signal is periodically sampled and from each sample amplitude there is derived a so-called quantized pulse amplitude by selecting from a predetermined set of discrete amplitude levels or quanta the particular amplitude quantum that most closely matches the sample amplitude. This quantized pulse is then uniquely represented by a number, for example, a binary number, which can be transmitted as a time series of $n$ positive and negative voltage pulses, each such time series constituting a so-called $n$ digit binary code word and a series of many such binary code words constituting a so-called binary pulse train, where $n$ is a selected positive integer. The number of pulses $n$ selected to represent each quantized pulse is determined by the accuracy with which it is desired to describe each sample amplitude.

The receiver groups the binary pulse train as received into provisional $n$ digit binary code words and then decodes each provisional binary code word by converting it into a quantized pulse representing, if the receiver is in-frame with the transmitter, the sample from which each such code word was derived. The receiver converts each provisional binary code word into a quantized pulse by first storing the first and each succeeding binary digit of each provisional binary code word until the last binary digit in the provisional code word reaches the receiver and then releasing the $n$ retained binary digits simultaneously through, for example, a weighting and summing network. In the summing and weighting network the voltage pulse representing each digit is weighted by its importance relative to the most significant digit in an $n$ digit binary code word and then combined with the $(n-1)$ other weighted voltage pulses to form the desired quantized pulse.

It is clear that for the quantized pulse reconstructed by the receiver to have the same magnitude as the original quantized pulse, the receiver must receive and store the correct time series of binary digits. If the receiver erroneously groups the binary pulse train into provisional code words so that the last binary digit in a preceding transmitted code word becomes the first binary digit in the provisional binary code word being decoded, the receiver is said to be out-of-frame by an advance of one bit, or equivalently, the provisional binary code word is said to be out-of-frame by a delay of one bit. If the receiver erroneously groups the binary pulse train into provisional code words so that the first binary digit in the following transmitted code word becomes the last binary digit in the provisional binary code word being decoded, the receiver is said to be out-of-frame by a delay of one bit, or equivalently the provisional binary code word is said to be out-of-frame by an advance of one bit. Similarly, erroneous groupings at the receiver can cause delays or advances of up to $(n-1)$ bits when each of the binary code words contains $n$ bits.

An out-of-frame condition at the receiver can be determined by the use of marker signals periodically added to the information bearing positive and negative voltage pulses or "bits" which make up the binary code words. Such a method is described in Transmission Systems for Communications, 3rd edition, published by Bell Telephone Laboratories, Incorporated, 1964, at page 641. However, such marker signals reduce the amount of useful information which can be carried by a transmission channel. It has been suggested that the use of such marker signals to maintain the receiver in-frame can be eliminated by comparing certain statistics of the decoded analog output signal with the anticipated values of these same statistics in the analog input signal. For example, the copending J. S. Mayo-R. J. Trantham application, Ser. No. 126,285, now Patent No. 3,175,157, filed July 24, 1961, discloses an arrangement for maintaining the receiver in-frame which requires, in one embodiment, comparing the root means square or RMS value of the analog output signal from the receiver with a reference voltage representative of the RMS value of the original analog input signal. Reframing is initiated when the difference between the two values exceeds a certain magnitude.

The J. S. Mayo-R. J. Trantham application also shows that the receiver can be maintained in-frame by adding to the input signal a tone signal which has a frequency one-half the sampling frequency, in order not to interfere with the information bearing input signal, and which is phase locked to the sampling frequency. The tone signal indicates both the occurrence and degree of an out-of-frame condition because the amplitude level of the tone signal recovered at the receiver varies as a function of the number of bits by which the receiver is out-of-frame. However, the difference between the tone signal amplitude level at the receiver for one bit out-of-frame and the tone signal amplitude level for the receiver in-frame can be quite small and therefore it may be quite difficult to distinguish between the in-frame and out-of-frame conditions. Moreover, this difference is also a function of both the input tone amplitude and the input signal statistics. Thus, in general, highly accurate apparatus is required to detect the tone amplitude difference associated with the out-of-frame condition.

The present invention also utilizes a tone signal for maintaining the receiver in-frame, but avoids the necessity for providing highly accurate apparatus to distinguish between the different amplitude levels of the recovered tone signal associated with the in-frame and out-of-frame conditions. In particular, this invention utilizes the fact that each binary code word in the binary pulse train represents the sum of one sample of the information bearing analog input signal to the transmitter and one simultaneously obtained sample of the tone signal, that is, in general, each digit of each binary code word carries two components, one attributable to the input signal sample and the other attributable to the simultaneously obtained tone signal sample. It has been determined that the addition of a tone signal sample to each of a succession of randomly related input signal samples does not influence each digit in the resulting succession of code words in the same way. Rather, the added tone signal sample causes the pulse occupying the position of the most significant digit in each transmitted code word to differ markedly from all other pulses in that code word in that over a suitable interval of time, the average value of the most significant digit pulse will have a substantially greater absolute magnitude than the average value of any other pulse and a polarity opposite to the polarity of the average value of all other pulses carrying significant tone signal sample components.

The present invention employs these relationships between pulses in each code word to determine whether the receiver is in-frame by deriving from each provisional code word at the receiver a measure of the relative magnitude and polarity of the average value of the pulse occupying the most significant digit position, and by comparing this measure against a selected reference. A deviation of this derived measure from the reference is used to indicate the framing condition of the receiver. When this measure exceeds the reference by more than a predetermined amount the receiver is considered to be in-frame and reframing is not necessary, whereas when this measure exceeds the reference by less than the predetermined amount the receiver is considered to be out-of-frame and reframing is initiated.

Two embodiments of this invention are described in detail for illustrative purposes. The first utilizes as a framing indicator the 180 degree phase difference which has been found to exist between the average values of the respective tone signal sample components carried by the first and second most significant digits of each transmitted binary code word by subtracting algebraically the average value of the tone signal component carried by the second digit of each of a series of provisional binary code words from the average value of the tone signal component carried by the first digit of each of the same series of provisional binary code words. This algebraic difference is a maximum when the receiver is in-frame due to the large magnitudes and opposite phases of the tone signal sample components carried by these first two digits of each provisional binary code word. However, when the receiver is misframed, the algebraic difference between the average values of the tone signal components of these two digits is much less than for the in-frame condition due to the fact that the apparent first and second digits in each of the misframed provisional code words are in fact not the true first and second digits of the transmitted code words. Hence the average values of the tone signal components carried by the first and second digits in the misframed provisional code words are either in-phase or so small in magnitude that their relative phases are unimportant. In the arrangement provided by this invention, deviations from the anticipated in-frame value of this difference are used to initiate reframing of the receiver until the in-frame difference value is regained.

The second embodiment utilizes the fact that when the receiver is in-frame with the transmitter each sample of the recovered tone signal is opposite in phase to the corresponding sample of a specially generated reference tone signal. The reference tone signal is obtained by advancing duplicates of the received binary pulses by one bit relative to the true time positions of these pulses and decoding each resulting binary code word simultaneously with each apparently correctly grouped binary code word. When the receiver is in-frame, the recovered and reference tone signal samples are opposite in phase, but when the receiver is out-of-frame by a delay of $i$ bits, where $1<i<n$, the recovered and reference tone signals are in-phase. This phase relation between the recovered and reference tone signals is easily recognized and reframing of the receiver is initiated whenever the recovered and reference tone signals are in phase and is terminated whenever the two tone signals return to phase opposition.

This invention will be more fully understood from the following description of the theory upon which it is based taken together with the appended drawing in which.

FIGS. 5A and 5B comprise a table showing the magnitudes and phase of the recovered tone signal for several out-of-frame conditions; and FIG. 6 is a table showing the magnitudes of the tone signal components carried by each digit of a nine digit code word.

*Theory*

In certain situations, the input signal to the transmitter in a typical pulse code transmission system is a succession of samples derived by successively sampling a predetermined number of information channels which form a so-called mastergroup. For analytical purposes it is convenient to consider this succession of samples from different channels as samples of a single analog input signal, in which case the analog input signal has an amplitude probability distribution which depends on the number of information channels included in the mastergroup formed at the transmitter. It has been found that when the number of channels becomes sufficiently large, the signal variations in one channel appear to occur randomly with respect to the signal variations in the other channels, and the amplitude probability distribution of such an input signal closely resembles the normal probability distribution associated with Gaussian noise signals. The properties of Gaussian noise signals are such that each sample of such a noise signal is uncorrelated with any other sample if the sampling frequency is twice the Gaussian noise bandwidth and the noise signal has zero mean. Therefore an input signal characterized by a Gaussian probability distribution has an expected or average amplitude and a most probable amplitude which are both zero.

Figure 3A:
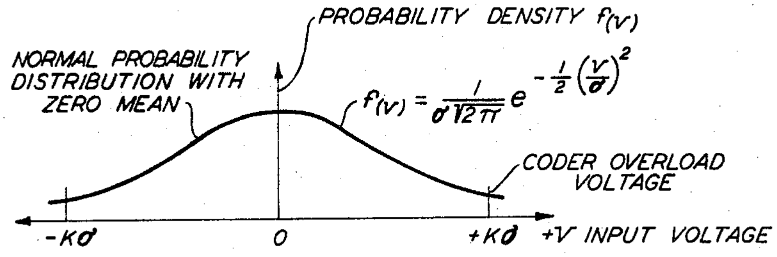
FIG. 3A shows the normal probability distribution curve with a mean of zero.

FIG. 3A shows the voltage probability distribution function of an input signal with a normal distribution. The area beneath the voltage probability distribution function, $f(v)$, and between any two voltage levels on the abscissa represents the probability that the input signal voltage, $v$, will be between the two voltage levels. The equation for the normal voltage probability distribution function, $f(v)$, is $$f(v)=\frac{1}{\sigma\sqrt{2\pi}}e^{-\frac{1}{2}\left(\frac{v-\bar{v}}{\sigma}\right)^2} \quad (1)$$

where $\sigma$ is the standard deviation of the input signal voltage $v$, and $\bar{v}$ is the average input signal voltage. The derivation of this equation is given in most introductory statistics texts. See, for example, Hoel, "Introduction to Mathematical Statistics," 2d edition, 1954, pages 76–79.

For framing purposes, samples of a selected tone signal are transmitted together with samples of the analog input signal, and it has been determined that the addition of these tone signal samples to the input signal samples alters the input signal probability distribution in a specific manner. It should be pointed out that for the purpose of the following analysis, the addition of a selected tone signal to an analog input signal can be accomplished in either of two ways: by sampling the sum of the combined analog input signal and tone signal or by sampling individually but simultaneously the tone signal and the input signal and adding the two resulting samples to obtain one combined sample. The latter approach is believed to aid in understanding the effect that the added tone signal has on the probability distribution of the analog input signal. Specifically, by adding to each input signal sample a simultaneously obtained sample of a tone signal which has a frequency one-half that of the sampling frequency and which is phase locked to the sampling frequency, the resulting series of combined samples is readily shown to have a probability distribution whose means is alternately displaced from zero in synchrony with alternations in the tone sample polarity and by an amount determined by the tone sample amplitude.

Figure 4A:
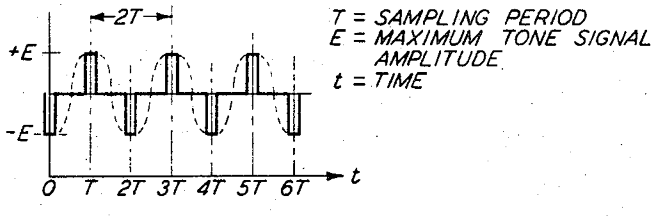
FIG. 4A illustrates a portion of the series of samples obtained by sampling a tone signal.
Figure 4B:
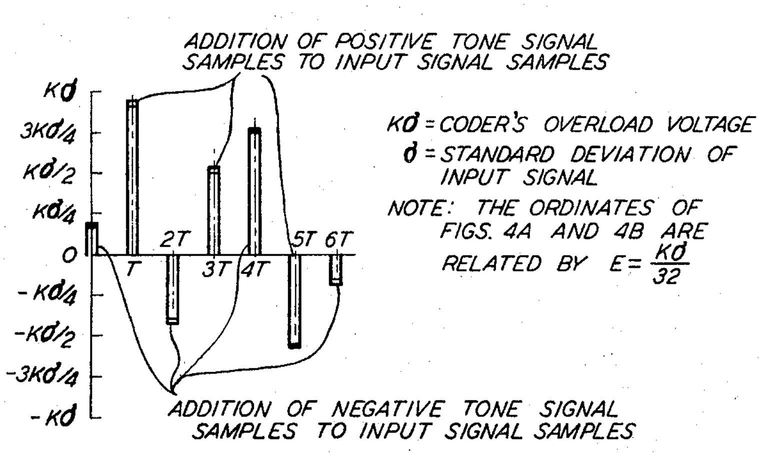
FIG. 4B shows the effect of adding tone signal samples to corresponding input signal samples.
Figure 3B:
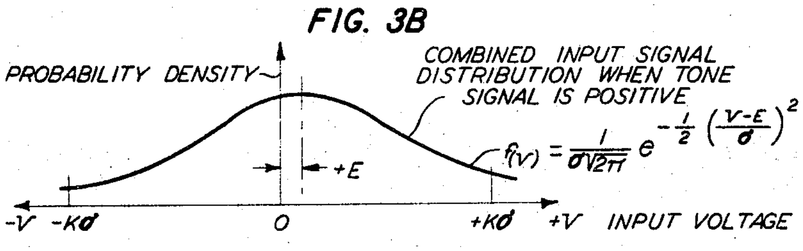
FIG. 3B illustrates the probability distribution of an input signal combined with a tone signal when the tone signal is at its positive maximum value, $+E$.
Figure 3C:
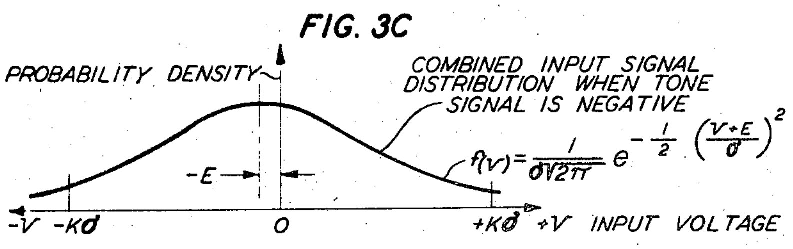
FIG. 3C shows the probability distribution of an input signal combined with a tone signal when the tone signal is at its negative maximum value, $-E$.

FIGS. 4A and 4B graphically illustrate this effect. FIG. 4A shows the series of samples obtained by sampling the tone signal. Each sample is equal in magnitude but opposite in polarity to its neighboring samples due to the fact that the tone signal has a frequency one-half the sampling frequency and thus is sampled twice per tone signal cycle, once when the tone signal is positive, and once when the tone signal is negative. FIG. 4B shows the series of samples derived by sampling the analog input signal. Superimposed on this series is the series of samples simultaneously obtained from the tone signal. The input signal samples obtained at times T, 3T, 5T . . . $(2p+1)T$, where $0 \leq p < \infty$, are increased by the addition of a positive tone signal sample with magnitude +E while those input signal samples obtained at times 0, 2T, 4T . . . $p$T, where $0 \leq p < \infty$, are decreased by the addition of a negative tone signal sample with magnitude —E. Thus when the input signal and the tone signal are sampled twice per tone signal cycle, once when the tone signal is at its maximum positive value, +E, and once at its maximum negative value, —E, the mean value of the probability distribution of the series of samples obtained by adding each input signal sample to a simultaneously obtained tone signal sample alternates between +E and —E. This effect on the probability distribution of the combined samples is illustrated in FIGS. 3B and 3C respectively. FIG. 4B shows also that each sample in the series of samples obtained by adding each input signal sample to a simultaneously obtained tone signal sample has both a tone signal component and an input signal component. It follows that each digit in the $n$ digit binary code word into which each sample is coded also has in general both a tone signal sample component and an input signal sample component. It will now be shown how the addition of a tone signal sample to each input signal sample quantitatively affects the average value of the voltage pulse representing the $i$th digit of the binary code word derived from the corresponding combined signal sample, where $1 \leq i \leq n$.

Figure 3D:
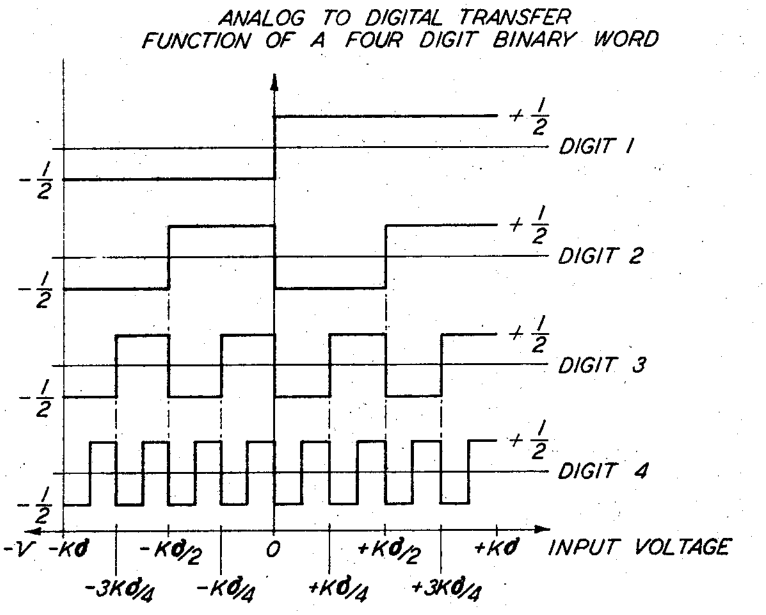
FIG. 3D illustrates the analog to digital transfer function of the transmitter of a pulse code transmission system which codes all analog input signals into four digit binary code words.

The transmitter in a pulse code transmission system codes the magnitude of each combined sample into an $n$ digit binary code word composed of a series of $n$ positive and negative voltage pulses. FIG. 3D is the analog to digital transfer function for a transmitter utilizing a four digit binary code word, that is for $n=4$. It is seen from the DIGIT 1 graph in FIG. 3D that the voltage pulse representing the most significant, or first, digit in the binary code word has a magnitude of +½ for a positive combined sample, that is, for a combined sample amplitude that is between 0 and $+\infty$, and a magnitude of —½ for a negative combined sample, that is, for a combined sample amplitude between 0 and $-\infty$. Similarly, as shown by the DIGIT 2 graph in FIG. 3D, the voltage pulse representing the second most significant, or second, digit has a magnitude of +½ for a combined sample amplitude between either $K\sigma/2$ and $\infty$ or zero and $-K\sigma/2$ and has a magnitude of —½ for a combined sample amplitude between either zero and $K\sigma/2$ or $-K\sigma/2$ and $-\infty$, where $K\sigma$ is the coder's overload voltage. The combined sample voltages for which the voltage pulses representing the third and fourth most significant digits assume the values plus or minus one-half can readily be determined from the DIGIT 3 and DIGIT 4 graphs in FIG. 3D.

The probability of either a positive voltage pulse which represents a binary one or a negative voltage pulse which represents a binary zero on any digit of a four digit binary word can be determined from FIGS. 3B, 3C, and 3D combined. The probability, denoted $P_1(1/+E)$, of a positive voltage pulse, or a binary one, on digit 1 when the tone signal has a value of +E is just the integral of the combined input signal distribution, $f(v)$, in FIG. 3B from zero to plus infinity. This integral can be written $$P_1(1/+E)\int_0^{+E} f(v)dv+\int_{+E}^{+\infty} f(v)dv \qquad (2)$$

For a normal distribution with a mean equal to +E, $$\int_{+E}^{+\infty} f(v)dv=\frac{1}{2}$$

The first integral on the right hand side of Equation 2 is just the area under the combined input signal distribution between zero and +E. If this area is called $\Delta_1$, and if $$u=\frac{v-E}{\sigma}$$

is substituted for $$\left|\frac{v-\bar{v}}{\sigma}\right|$$

in the definition given above for $f(v)$, then $$\Delta_1=\int_0^{+E} f(v)dv$$
$$=\frac{1}{\sqrt{2\pi}}\int_0^{+E/\sigma} e^{-(1/2)u^2}du$$
$$=F\left(\frac{E}{\sigma}\right) \qquad (2a)$$

and Equation 1 can be written $$P_1(1/+E)=½+\Delta_1 \qquad (3)$$

The term $F(E/\sigma)$ is merely a convenient way of representing the integral of the normal distribution, $f(v)$, between zero and +E. Later in the development of this theory, use will be made of the relation $$F(-E/\sigma)=-F(E/\sigma)$$

based on the fact the integral of the normal distribution is an odd function.

Since the tone signal can also have a value of —E when the combined input signal is sampled, there is an associated probability, $P_1(1/-E)$, of a positive voltage pulse or a binary one, on digit 1 when the tone signal has a value of —E.

From FIG. 3C, $$P_1(1/-E)=\int_0^{+\infty} f(v)dv$$
$$=\int_{-E}^{+\infty} f(v)dv-\int_{-E}^{0} f(v)dv \qquad (4)$$

Since the value of the first integral is ½ and the second integral is just $\Delta_1$, Equation 4 can be written $$P_1(1/-E)=½-\Delta_1 \qquad (5)$$

The probability of obtaining a binary zero or negative voltage pulse on digit 1 when the tone signal is either +E or —E can be calculated by the same procedure. The resulting probabilities are $$P_1(0/+E)=½-\Delta_1 \qquad (6)$$
$$P_1(0/-E)=½+\Delta_1 \qquad (7)$$

An expression for $\Delta_1$ has been obtained. It will be shown later that the average value of the voltage pulse on the $i$th digit of each code word is proportional to $\Delta_i$. To do this it is first necessary to calculate the values of the $\Delta_i$ terms for $2<i<n$. Referring again to FIGS. 3B and 3D, the probability of obtaining a positive voltage pulse, or a binary one, on digit 2 when the tone signal has a value of +E is $$P_2(1/E)=\int_{-K\sigma/2}^{0} f(v)\,dv+\int_{K\sigma/2}^{\infty} f(v)\,dv \quad (8)$$

But from FIGS. 3B and 3D it can be shown that $$\int_{K\sigma/2}^{\infty} f(v)\,dv=\frac{1}{2}-\int_{+E}^{K\sigma/2} f(v)\,dv \quad (9)$$

Combining Equations 8 and 9, using the fact that the integral of $f(v)$ with respect to $v$ is an odd function so that $$F\left(-\frac{E}{\sigma}\right)=-F\left(\frac{E}{\sigma}\right)$$

and making the substitutions $$u=\frac{(v-E)}{\sigma} \quad (10)$$

$$F(a)=\frac{1}{\sqrt{2\pi}}\int_0^a e^{-(1/2)u^2}\,du \quad (11)$$

where $a$ is any appropriate constant, gives $$P_2(1/+E)=\frac{1}{2}-F\left(\frac{E}{\sigma}\right)+F\left(\frac{K}{2}+\frac{E}{\sigma}\right)-F\left(\frac{K}{2}-\frac{E}{\sigma}\right) \quad (12)$$

If $\Delta_2$ is defined as $$\Delta_2=-F\left(\frac{E}{\sigma}\right)+F\left(\frac{K}{2}+\frac{E}{\sigma}\right)-F\left(\frac{K}{2}-\frac{E}{\sigma}\right) \quad (13)$$

then $$P_2(1/+E)=½+\Delta_2 \quad (14)$$

To find $P_2(0/+E)$, $P_2(1/-E)$, and $P_2(0/-E)$ it is first noted that the analysis of digit 1 showed that $$P_1(1/+E)=P_1(0/-E) \quad (15)$$

$$P_1(0/+E)=P_1(1/-E) \quad (16)$$

The transfer function for digit 1 is seen from FIG. 3D to be an odd function, as are the transfer functions for digits 2 through $n$; hence Equations 15 and 16 are valid not just for digit 1, but for all digits. Thus these equations can be generalized so that $$P_i(1/+E)=P_i(0/-E) \quad (17)$$

$$P_i(0/+E)=P_i(1/-E) \quad (18)$$

where $i=1, 2, \ldots, n$.

Also, since the $i$th digit must always transmit either a binary one or a binary zero $$P_i(1/+E)+P_i(0/+E)=1 \quad (19)$$

$$P_i(1/-E)+P_i(0/-E)=1 \quad (20)$$

The following equations for digit 2 are easily obtained from Equations 14, 17, 18, and 19.

$$P_2(0+E)=½-\Delta_2 \quad (21)$$

$$P_2(1-E)=½-\Delta_2 \quad (22)$$

$$P_2(0-E)=½+\Delta_2 \quad (23)$$

On the third digit, the probability of obtaining a positive volatge pulse when the tone signal has a value of $+E$ is $$P_3(1/+E)=\int_{-3K\sigma/4}^{-2K\sigma/4} f(v)\,dv+\int_{-K\sigma/4}^{0} f(v)\,dv+\int_{K\sigma/4}^{2K\sigma/4} f(v)\,dv+\int_{3K\sigma/4}^{+\infty} f(v)\,dv \quad (24)$$

When substitutions similar to those made on digit 2 are made, it is found that $$\Delta_3=-F\left(\frac{E}{\sigma}\right)+F\left(\frac{K}{4}+\frac{E}{\sigma}\right)-F\left(\frac{K}{2}+\frac{E}{\sigma}\right)+F\left(\frac{3K}{4}+\frac{E}{\sigma}\right)-F\left(\frac{K}{4}-\frac{E}{\sigma}\right)+F\left(\frac{K}{2}-\frac{E}{\sigma}\right)-F\left(\frac{3K}{4}-\frac{E}{\sigma}\right) \quad (25)$$

In general, when $$E\leq\frac{K\sigma}{2^{n-1}}$$

where $K\sigma$ is the coder's overload voltage and $n$ is the number of digits in each binary code word, it can be shown that $\Delta_i$, where $2\leq i\leq n$, is given by $$\Delta_i=-F\left(\frac{E}{\sigma}\right)+\sum_{l=2}^{2^{i-1}}(-1)^l\left[F\left(\frac{[l-1]K}{2^{i-1}}+\frac{E}{\sigma}\right)-F\left(\frac{[l-1]K}{2^{i-1}}-\frac{E}{\sigma}\right)\right. \quad (26)$$

and that the probability of having a binary one on the $i$th digit when the tone signal is positive is given by $$P_i(1/+E)=½+\Delta_i \quad (27)$$

FIG. 5A gives the values of $\Delta_i$ for a nine digit binary word, for one realizable value of the ratio $E/\sigma$ and for $K=4$ where K is the ratio of the coder's overload voltage to the standard deviation, $\sigma$, of the input signal, The term $\Delta_i$ is the amount by which the tone signal biases the probability of obtaining a binary one or zero on the $i$th digit given either a positive or negative tone signal amplitude at the instant of sampling. If the tone signal is positive, the probability of obtaining a binary one is increased by $\Delta_i$ while the probability of obtaining a binary zero is decreased by the same amount. In general, $\Delta_i$ can be either positive or negative so the net change in probability depends on the sign of $\Delta_i$. The numerical value of $\Delta_i$ associated with each digit is unique for a given input signal probability distribution, tone signal amplitude, E, and coder overload voltage, $K\sigma$. An analysis of Equation 26 shows that if the tone signal is zero, that is, if $E=0$, the term $\Delta_i$ is also zero. Thus $\Delta_i$ is just the average magnitude of the tone signal component transmitted by the $i$th digit.

Because the addition of a tone signal sample to each input sample affects the probability of obtaining a binary one or a binary zero on each code word digit, the average value of the voltage on each digit is also affected. Specifically, it will now be shown that the expected value of the output voltage $\langle v_i \rangle$ on the $i$th digit is proportional to the probability bias, $\Delta_i$, associated with the $i$th digit as a result of adding a tone signal. Hence by averaging the voltages on selected digits over a suitable interval, and comparing the average voltages against expected voltage levels, it may be determined whether the receiver is in-frame with the transmitter.

The expected value of a parameter is that value which is obtained by averaging the values obtained from many observations. When a parameter can assume only a limited number of discrete values, its expected value can be calculated by summing the products obtained by multiplying each possible value of the parameter with the probability of an occurrence of each value. The derivation of this technique is given, for example, in Laning and Battin, "Randon Processes in Automatic Control," published by McGraw-Hill Book Company, Inc., 1956, on page 45. The expected value of the output voltage on the $i$th digit, $\langle v_i \rangle$, after $2m$ code words representing the combined signal have been received at the receiver can be calculated by summing the expected values of two components, one $$\sum_{l=0}^{m} a_{2l}\, g(t-2lT)$$

representing the series of $m$ voltage pulses generated on the $i$th digit of each provisional binary code word when the tone signal is positive, and the other, $$\sum_{l=0}^{m} a_{2l+1} g[t-(2l+1)T]$$

representing the series of $m$ voltage pulses generated on the $i$th digit of each provisional binary code word when the tone signal is negative. The symbol $m$ represents any selected positive integer. The terms $a_{2l}$ and $a_{2l+1}$ represent the magnitudes of the voltages on the $i$th digit at two successive sampling instants, $t=2lT$ and $t=(2l+1)T$, respectively. These voltages can be either $+\frac{1}{2}$, representing a binary one, or $-\frac{1}{2}$, representing a binary zero. The functions $g(t-2lT)$ and $g[t-(2l+1)T]$ are the well known sampling functions which are zero when their arguments are nonzero and one when their arguments are zero.

The expected value $\langle v_i \rangle$ of the output voltage on the $i$th digit after $2m$ samples have been received at the receiver is just the average of the $2m$ successive individual voltages, $v_{il}$.

$$\langle v_i \rangle = \frac{\sum_{1}^{2m} v_{il}}{2m} = \frac{\sum_{l=0}^{m} a_{2l} g(t-2lT)}{m} + \frac{\sum_{l=0}^{m} a_{2l+1} g[t-(2l+1)T]}{m}$$
$$= \langle a_2 l \rangle \sum_{l=0}^{m} g(t-2lT) + \langle a_{2l+1} \rangle \sum_{l=0}^{m} g[t-(2l+)T] \tag{28}$$

Since the series $$\sum_{l=0}^{m} a_{2l} g(t-2lT)$$

represents the pulses generated on the $i$th digit when the tone signal is positive, the first term on the right hand side of Equation 28 may be expressed in terms of the probabilities previously derived. Thus $$\langle a_{2l} \rangle \sum_{l=0}^{m} g(t-2lT)$$
$$= \left[\left(\frac{1}{2}\right) P_i(1/+E) + \left(-\frac{1}{2}\right) P_i(0/E)\right] \sum_{l=0}^{m} g(t-2lT)$$
$$= \Delta_i \sum_{l=0}^{m} g(t-2lT) \tag{29}$$

Similarly, since the series $$\sum_{l=0}^{m} a_{2l+1} g[t-(2l+1)T]$$

represents the pulses generated on the $i$th digit when the tone signal is negative, the second term on the right hand side of Equation 28 may also be expressed in terms of the previously derived probabilities. Thus $$\langle_{2l+1}\rangle \sum_{l=0}^{m} g[t-(2l+1)T]$$
$$= \left[\left(\frac{1}{2}\right) P_i(1/-E) + \left(-\frac{1}{2}\right) P_i(0/-E)\right] \sum_{l=0}^{m} [t-(2l+1)T]$$
$$= -\Delta_i \sum_{l=0}^{m} g[t-2l+1)T] \tag{30}$$

By combining Equations 28, 29, and 30, the following equation for the expected value of the output voltage on the $i$th digit is obtained.

$$\langle v_i \rangle = \Delta_i \sum_{l=0}^{2m} (-1)^l g(t-lT) \tag{31}$$

In Equation 31 the subscript $i$ can vary from one to $n$ where $n$ is the number of bits in the binary code word used to represent the magnitude of each quantized sample.

The expected value of the output voltage on any digit can be obtained from Equation 31 by substituting the appropriate subscript. Thus the expected value of the output voltage on the first digit is just $$\langle v_1 \rangle = \Delta_1 \sum_{l=0}^{2m} (-1)^l g(t-lT) \tag{32}$$

Equation 31 shows that the expected value of the output voltage $\langle v_i \rangle$ on each digit, $i$ is proportional to $\Delta_i$. FIG. 5A shows that the values of $\Delta_i$ decrease and approach zero as $i$ increases from 1 to $n$. In particular, the difference between the absolute magnitude of $\Delta_1$ and the absolute magnitude of $\Delta_2$ for $E/\sigma=\frac{1}{8}$, $K=4$ and $n=9$ is 0.0136. But by considering the 180 degrees phase difference between these two quantities, as indicated by the difference in sign between the two values, the algebraic difference between these quantities is 0.08588 or 6.32 times the difference of the absolute magnitudes of these two quantities. The next largest algebraic difference is between $\Delta_9$ and $\Delta_1$, and this difference is 0.0497 or only 58 percent of the difference between $\Delta_1$ and $\Delta_2$. All other differences between $\Delta_i$ and $\Delta_{i+1}$ are even less than the difference between $\Delta_9$ and $\Delta_1$. The absolute difference of the algebraic magnitudes of the average voltages representing the first and second most significant binary digits will thus always be at least 1.7 times as large for the in-frame conditions of the receiver as it will be for the receiver $r$ bits out-of-frame, where $1 \leqslant r < n$. This follows since in the event that the receiver is out-of-frame, the voltages measured on the first two digit positions will not be those of the true first and second digits, but those of two other adjacent digits. This difference thus can be used to maintain the receiver in-frame.

Figures 1A, 1B:
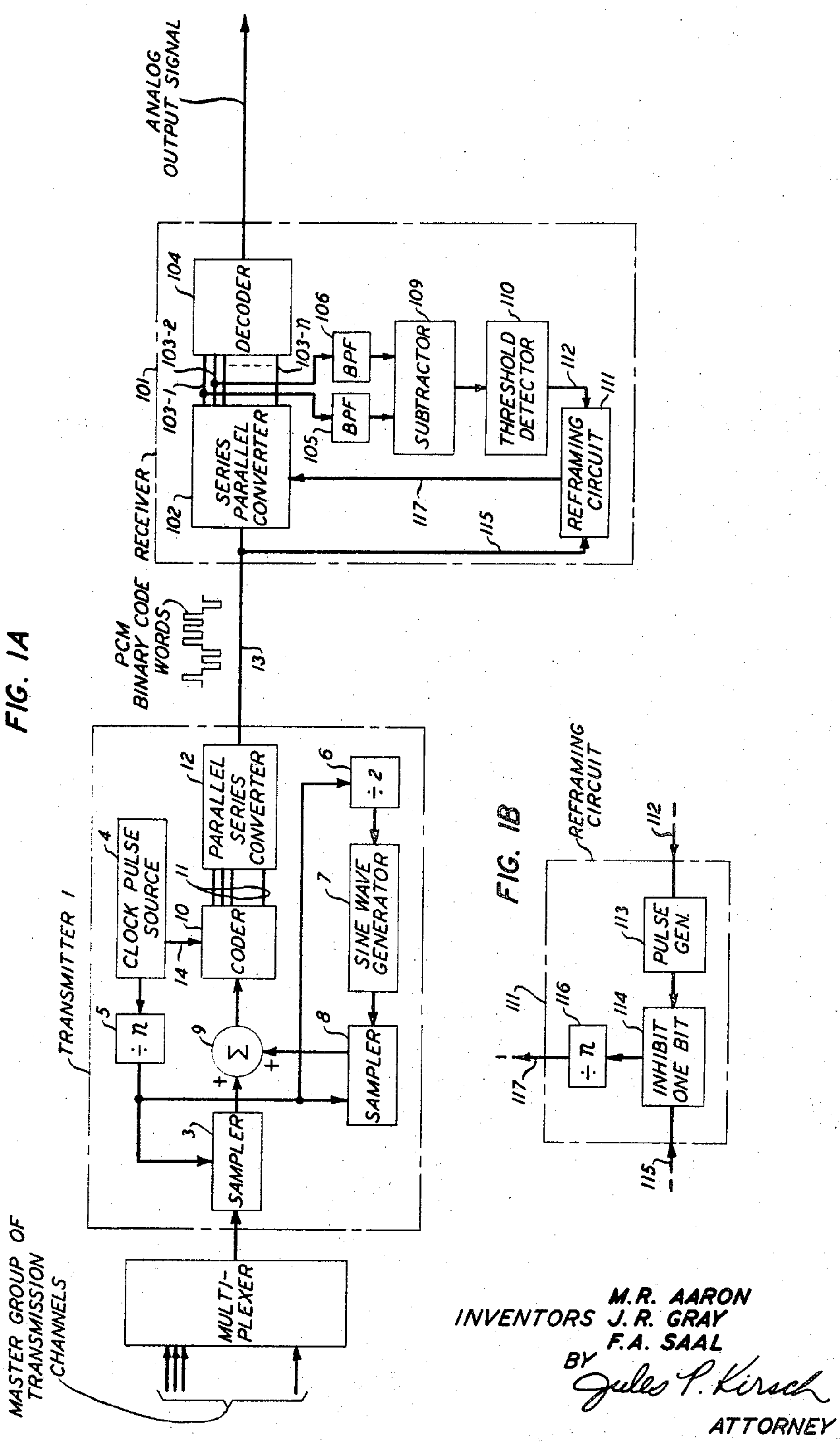
FIG. 1A is a schematic drawing of a reframing system embodying the principles of this invention.
FIG. 1B is a schematic drawing of an element of the reframing system shown in FIG. 1A.

Referring now to FIG. 1A, this is a schematic diagram of a pulse code transmission system in which framing information is obtained from the relative phases of the voltage pulses on the first and second digits of each provisional binary code word. The input terminal of the transmitter 1 is connected to a large number of voice-frequency channels, say 600, via frequency division multiplexer 2. Multiplexer 2 modulates the signals on each of the 600 voice-frequency channels to produce sidebands for each of 600 carrier frequencies, and then transmits the resulting modulation products to transmitter 1 for transmission in a coded form. The input signals to the transmitter 1 are sampled periodically by a sampler 3 at a frequency at least twice the highest frequency of the information bearing components in the input signals. The sampling frequency is derived from a clock pulse source 4 having a clock pulse output frequency equal to the desired repetition frequency of the pulses in the binary code word into which each sample is coded. By dividing the clock pulse output frequency by the number of digits $n$ in each binary code word, there is obtained a sequence of sampling pulses to control sampler 3. This division is carried out in a divider circuit 5 which may be realized by a conventional digital counter circuit which produces an output pulse for every $n$ incoming clock pulse.

The tone signal is generated by dividing by two the output of the divider circuit 5 in a second divider circuit 6. The output of the second divider circuit 6 controls the frequency of a sine wave generator 7, the output signal of which is a tone signal phase locked to the sampling frequency and with a frequency one-half the sampling frequency. The tone signal is sampled in a second sampler 8 at time intervals controlled by the output of the first divider circuit 5 and each sample of the tone signal is then added to the simultaneously obtained sample of the input signal in an addition network 9. The resulting combined sample is transmitted to a coder 10 which quantizes each combined sample and then converts each quantized sample to an $n$ bit binary code word, where $n$ may be any desired postive integer, for example, nine. The $n$ voltage pulses representing the digits of each binary code word are transmitted simultaneously through $n$ leads 11 to a parallel-series converter 12 which then transmits these voltage pulses through a transmission medium 13 to a receiver 101 as a time series of positive and negative voltage pulses. A sequence of many such time series of pulses, representing many binary code words, will be referred to hereafter as a pulse train. The period of the voltage pulses which make up the binary pulse train is controlled by the output frequency of the clock 4, which frequency is transmitted to the coder 10 by lead 14.

Within receiver 101 the binary pulse train enters a series-parallel converter 102 which stores the first bit in each binary code word until the last bit in each code word reaches the receiver 101 and then simultaneously transmits the $n$ stored bits over $n$ parallel leads 103–1 through $n$ to the decoder 104. The decoder 104 converts each binary code word into a quantized sample, the amplitude of which is uniquely given by the binary code word. Each reconstructed quantized sample is then converted into an output sample which is a replica of the original input sample.

It is evident, however, that in order for the replica output sample to represent accurately the original input sample, the receiver 101 must be maintained in proper frame relationship with the transmitter 1. To maintain the receiver in-frame, two bandpass filters 105, 106, tuned to the tone signal frequency of one-half the sampling frequency, are connected to the first and second most significant digit leads 103–1, 103–2, from the series-parallel converter 102 to the decoder 104. The output signal of the filter 105 connected to the most significant digit lead 103–1 is a sinusoidal signal with a frequency one-half the sampling frequency and, for the in-frame condition, an amplitude proportional to $\Delta_1$ as given by Equation 2$a$. The output signal of the filter 106 connected to the second most significant digit lead 103–2 is a sinusoidal signal with a frequency one-half the sampling frequency and, for the in-frame condition, an amplitude proportional to $\Delta_2$ as given by Equation 13 or Equation 26. By substracting the output signal of filter 106 from the output signal of filter 105 in a subtractor 109, there is obtained from subtractor 109 a difference signal which is propertional to the difference $\Delta_1$–$\Delta_2$ for the in-frame operation of the receiver 101. The difference signal from the subtractor 109 is then compared with a reference voltage in a threshold detector 110 which issues a command signal to framing circuit 111 whenever the output signal of the subtractor 109 falls below the reference voltage.

The framing circuitry 111 is shown in more detail in FIG. 1B. An output signal is generated on lead 112 by the threshold detector 110 only when the receiver 101 is out-of-frame. The output signal from the threshold detector 110 activates a pulse generator 113 which in turn disables, for the time necessary to pass one bit, the transmission means 114, labeled "inhibit one bit," between input lead 115 and divider circuit 116. Thus the output pulse from divider circuit 116 which enables the series-parallel converter 102 by way of lead 117 is delayed by one binary pulse repetition period, or in the terminology of the pulse code art, by one bit, and therefore the binary code word groupings of the decoder 104 are shifted by one bit. This process continues until the receiver 101 is in-frame with the transmitter 1, as indicated by the absence of an output signal on lead 112 from detector 110.

An alternative arrangement for detecting an out-of-frame condition utilizes a comparison of the phase of the recovered analog tone signal with the phase of a reference tone signal generated at the receiver. A replica of each sample of the original tone signal can be reconstructed at the receiver from each transmitted binary code word by summing the products of (1) the average magnitude of each digit's tone signal component, and (2) the weighting factor associated with that digit.

A binary code word with $n$ digits is merely a series of $n$ binary ones or zeroes, in which the relative position of each binary one or zero determines its relative importance, which, in turn, is represented numerically by a weighting factor. If the last or least significant binary digit is given a weighting factor of one, the next to last, or second least significant digit has a weighting factor of two, and in general the $i$th least significant digit in an $n$ digit binary word, has a weighting factor of $2^{i-1}$ where $1 \leq i \leq n$. The first or most significant digit, which is also the $n$th least significant digit, has a weighting factor of $2^{n-1}$. Thus the tone signal component carried by the first, or most significant digit, is weighted by twice the weight given the tone signal component carried by the second digit, and so on.

The average magnitude of the tone signal component on each digit of a nine digit binary code word has been calculated and the results are presented in FIG. 5B together with both the weighting factor associated with each digit and the amplitude and phase of the decoded replica tone signal sample for all out-of-frame conditions. FIG. 5B is based on an $n=9$ digit binary code word and shows that the decoded tone signal undergoes a phase reversal when the receiver goes out-of-frame by a delay of from one to nine bits, for $E/\sigma=1/8$ and $K=4$, where $k$ is the ratio of transmitter overload voltage to the RMS voltage, $\sigma_0$, of the input signal. This phase reversal of the recovered tone signal is caused by the fact that when the receiver goes out-of-frame by a delay of up to $n$ bits, the most significant digit slot in the erroneously-framed received binary code word is occupied by a digit of less significance in the transmitted binary code word, rather than the most significant digit in the transmitted binary code word as is the case when the receiver is in-frame with the transmitter. This lesser significant digit, as shown by FIG. 6, has either a tone signal component opposite in sign to the tone signal component carried by the most significant digit in the transmitted binary code word or a zero magnitude tone signal component. As a result, the recovered replica tone signal, which has a magnitude determined by the size of the delay, is always 180 degrees out-of-phase with the transmitted tone signal. On the other hand, FIG. 5B shows that if the receiver is out-of-frame by an advance of up to $n$ bits, the recovered replica tone signal is in-phase with the transmitted tone signal. However, FIG. 5B also shows that a receiver advance of $i$ bits relative to the first transmitted binary code word is equivalent to a receiver delay of $n-i$ bits relative to the second transmitted binary code word, or equivalently, a receiver delay of $n-i$ bits relative to the preceding transmitted binary code word, where $i$ is a positive integer which can assume values limited by the relation $0 \leq i \leq n$. Thus, by treating all out-of-frame conditions as caused by receiver delays, the replica tone signal recovered from an out-of-frame receiver is always 180 degrees out-of-phase with the tone signal which would have been recovered if the receiver was in-frame.

Figure 2:
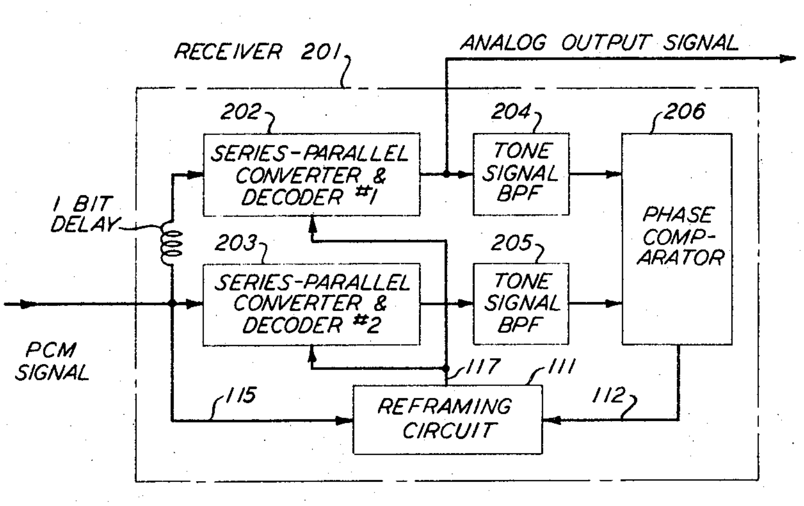
FIG. 2 is a schematic drawing of another embodiment of certain principles of this invention.

An embodiment utilizing this phase reversal of the recovered tone signal is illustrated in FIG. 2. FIG. 2 is the schematic drawing of a pulse code transmission system's receiver. At the receiver 201, the voltage pulses which form each received binary code word enter the first series-parallel converter and decoder 202 through a one bit delay and are converted into a quantized pulse representative of the quantized pulse from which they were derived. Each quantized pulse represents the approximate magnitude of one sample of the combined input and tone signal. The analog output signal from the receiver 201 is reconstructed from the series of samples obtained at the first converter-decoder 202 while the voltage pulses which form each code word are also sent to a second converter-decoder 203. The output signal from the second converter-decoder 203 is used to obtain a reference tone signal which, when the receiver is in-frame with the transmitter, is always 180 degrees out-of-phase with the tone signal obtained from the output signal of the first converter-decoder 202 but which, when the receiver is out-of-frame with the transmitter, is always in-phase with the tone signal obtained from the first decoder. This is done in the following manner. Prior to entering converter-decoder 202 each voltage pulse is delayed by one bit. Both the first and second converter-decoders 202, 203 are synchronized by a signal with a frequency equal to the sampling frequency derived in a divide by *n* circuit 116 shown in FIG. 1B by dividing the voltage pulse repetition frequency by the number of bits, *n*, in each binary code word. The output signal from the first converter-decoder 202 is filtered by a first bandpass filter 204 tuned to the tone signal frequency. The output signal from the second converter-decoder 203 is filtered by a second bandpass filter 205 also tuned to the tone signal frequency. The output signals of the two bandpass filters 204, 205 are compared in a phase compartor 206, which operates in such a manner that when the receiver 201 is in-frame with the transmitter 1, the output signal from the first bandpass filter 204 is opposite in phase to the output signal from the second bandpass filter 205, and the phase comparator 206 produces no output signal. However, when the receiver 201 is out-of-frame with the transmitter 1, the output signal from the first bandpass filter 204 is in-phase with the output signal from the second bandpass filter 205, and an output signal is generated by the phase comparator 206. The output signal from the phase comparator 206 activates reframing circuitry 111 identical to that shown in FIG. 1B.

It is to be understood that the above-described arrangements are merely illustrative of applications of the principles of the invention. Numerous other arrangements may be devised by those skilled in the art without departing from the spirit and scope of the invention. In particular, it should be recognized that the tone signal frequency does not necessarily have to be one-half the sampling frequency in order to use the tone signal to maintain a pulse code transmission system in-frame and that though for the purposes of this disclosure the information bearing analog input signal to the transmitter was assumed to be Gaussian, the tone signal can also be used to frame a pulse code transmission system which transmits a non-Gaussian input signal in which adjacent samples of the input signal are correlated.

What is claimed is:

1. Apparatus for automatically reframing the receiver of a pulse code transmission system at which there is received a sequence of code words in which each code word comprises *n* pulses representing in binary form the amplitude of the sum of one sample of an input signal and one simultaneously obtained sample of a tone signal, where *n* is a selected positive integer, said tone signal having a frequency which is a predetermined submultiple of the frequency at which said input signal and said tone signal are sampled, which comprises:

means for deriving from a predetermined plurality of code words in said sequence a control signal indicative of both the average magnitude and the phase of pulse occupying the most significant digit position in each of said plurality of code words, means for comparing said control signal with a selected reference signal to derive a framing signal that represents the framing condition of said receiver, and means responsive to said framing signal for adjusting said sequence of code words to bring said receiver into frame.

2. Apparatus for automatically reframing a coded signal composed of a series of code words in which each word comprises a group of *n* pulses representing in binary form the amplitude of one sample of the sum of an input signal and a tone signal, wherein said tone signal has a frequency that is a predetermined submultiple of the frequency at which said input signal and said tone signal are sampled, where *n* is a selected positive integer, which comprises:

means for deriving from said series of *n* digit binary code words a replica of said tone signal, means for comparing the phase of said replica tone signal with the phase of a selected reference tone signal to derive a control signal, and framing means responsive to said control signal for initiating reframing of said coded signal.

3. Apparatus for framing a pulse code signal in which each sample of a combined information bearing analog input signal and original tone signal is represented by a binary code word, which comprises:

means for deriving from a series of provisionally grouped binary code words both a reference tone signal and a provisional representation of the original tone signal, wherein correct framing of said provisionally grouped binary code words is indicated by said reference tone signal being out of phase with said provisional representation of said original tone signal and incorrect framing is indicated by said reference tone signal being in phase with said provisional representation of the original tone signal, means for comparing the phase of the reference tone signal with the phase of the provisional representation of the original tone signal to derive a control signal to initiate regrouping of the provisionally grouped binary code words, and means responsive to the control signal generated by said phase comparing means to regroup the provisionally grouped binary code words.

4. Apparatus for framing a pulse code transmission system which comprises:

a transmitter including a source of a tone signal, means for combining said tone signal with an information bearing input signal, and means for transmitting to a receiver in pulse code signal form said combined tone signal and input signal and at said receiver, means for recovering from said transmitted pulse code signal an analog output signal provisionally representative of the combined tone signal and input signal, means for obtaining a provisional recovered tone signal from said analog output signal, means for obtaining from said transmitted pulse code signal a reference tone signal with the same frequency as said provisional recovered tone signal, and having a phase opposite to that of said provisional recovered tone signal for an analog output signal correctly representing said combined tone signal and input signal and a phase the same as that of said provisional recovered tone signal for an analog output signal incorrectly representing said combined tone signal and input signal, means to compare the phase of said reference tone signal with the phase of said provisional recovered tone signal to derive a framing control signal indicative of the in phase relation between said reference tone signal and said provisional recovered tone signal, means for altering said analog output signal to represent correctly said combined tone signal and input signal in response to an in phase relation represented by said framing control signal.

5. Apparatus for automatically reframing a coded signal composed of a series of *n* digit code words in which each code word comprises a group of pulses representing in coded form the combined amplitude of one sample of an information bearing input signal and one sample of a tone signal having a frequency at a predetermined submultiple of the frequency at which said input and tone signals are sampled, which comprises:

means for deriving from the pulses representing the two most significant digits of each of said code words a control signal representing the algebraic difference of the magnitudes of the tone signal components carried by said two digits, and framing means responsive to said control signal for initiating reframing of said coded signal.

6. In a pulse code transmission system which codes each sample of the sum of an information bearing analog input signal and a tone signal generated at a submultiple of the sampling frequency into an $n$ digit code word and which transmits a series of such $n$ digit code words in the form of a pulse train composed of a sequence of positive and negative voltage pulses, that combination which comprises:

means for deriving two signals from a series of provisionally grouped $n$ digit code words, one of said signals representative of the average value of that part of each sample of the tone signal carried by the first digit of each provisionally grouped $n$ digit code word and the second of said signals representative of the average value of that part of each sample of the tone signal carried by the second digit of each provisionally grouped $n$ digit code word, means for subtracting the algebraic magnitude of the average value of that part of each sample of the tone signal carried by the second digit of each provisionally grouped $n$ digit code word from the algebraic magnitude of the average value of that part of each sample of the tone signal carried by the first digit of each provisionally grouped $n$ digit code word to derive a control signal having a magnitude indicative of the correctness of the provisional grouping of the $n$ digit code words, and means responsive to said control signal to initiate regrouping of the provisionally grouped $n$ digit code words for a control signal magnitude indicative of an erroneous provisional grouping of said $n$ digit code words.

7. In a pulse code transmission system apparatus which comprises:

a transmitter including means for generating a tone signal, means for combining said tone signal with an information bearing analog input signal, means for sampling said combined input signal and tone signal to derive therefrom a time sequence of samples, each sample therein representative of the sum of one sample of the tone signal and one simultaneously obtained sample of the information bearing analog input signal, and means for converting each sample of said combined tone signal and input signal into a code word composed of a series of $n$ digits, each digit carrying a component both of one sample of the tone signal and of one simultaneously obtained sample of the information bearing analog input signal, means for transmitting to a receiver each of said $n$ digit code words to a receiver in the form of a time series of positive and negative voltage pulses to develop a pulse train comprising a plurality of said time series of pulses, and at said receiver, means for dividing said pulse train into provisional $n$ digit code words, first means at said receiver for separating that component of the tone signal sample carried by the most significant digit of each of said provisional $n$ digit code words from that component of the input signal sample carried by the most significant digit of each of said provisional $n$ digit code words, second means at said receiver for separating that component of the tone signal sample carried by the second most significant digit of each of said provisional $n$ digit code words from that component of the input signal sample carried by the second most significant digit of each of said provisional $n$ digit code words, first means for comparing the average values of the algebraic amplitudes of the tone signal sample components obtained by said first and second separating means to derive a control signal indicative of the framing condition of the receiver, second means for comparing said control signal with a reference level, the difference between said reference level and said control signal being a measure of the degree of the out-of-frame condition of said receiver, and framing means to reframe said pulse train to obtain a new grouping of provisional $n$ digit code words when the said second comparing means indicates said receiver is out-of-frame with said transmitter.

8. In a pulse code transmission system, apparatus which comprises:

a transmitter station including a selected plurality of input channels for conveying a corresponding plurality of information bearing signals, said plurality of channels being sufficiently large so that the amplitude of the signal resulting from combining said information bearing signals is characterized by a random distribution, means for successively sampling each of said input channels at a predetermined sampling frequency to obtain a corresponding succession of signal samples, a source of a tone signal having a frequency that is phase locked to said sampling frequency and that is a selected submultiple of said sampling frequency, means for sampling said tone signal at said predetermined sampling frequency to obtain a succession of tone samples each of which is in time coincidence with one of said succession of signal samples, means for combining each of said signal samples with its time-coincident tone sample to obtain a succession of combined samples, and coding means supplied with said succession of combined samples for deriving from said succession of combined samples a corresponding succession of code words in which each code word contains a predetermined number of pulses which represent in binary form the amplitude of said combined signal, a transmission medium for delivering said succession of code words to a receiver, said receiver including first filter means for obtaining from the first pulse occupying the first most significant position in each code word a first indicator signal representative of that portion of the tone sample carried by said first pulse, second filter means for obtaining from the second pulse occupying the second most significant position in each code word a second indicator signal representative of that portion of the tone sample carried by said second pulse, subtracting means for obtaining from said first and second indicator signals a difference signal representing the algebraic difference between said first and second indicator signals, threshold means supplied with said difference signal for comparing the amplitude of said difference signal against a predetermined reference signal to obtain a control signal indicative of the frame relationship between said receiver and said transmitter, and means responsive to said control signal for adjusting the frame relationship between said receiver and said transmitter.

References Cited

UNITED STATES PATENTS

| | | | |
|---|---|---|---|
| 3,175,157 | 3/1965 | Mayo et al. | 325—321 |
| 3,294,907 | 12/1966 | Heald | 178—67 |

ROBERT L. GRIFFIN, *Primary Examiner.*

R. L. RICHARDSON, *Assistant Examiner.*